United States Patent [19]

Sulzbach et al.

[11] Patent Number: 5,665,286
[45] Date of Patent: Sep. 9, 1997

[54] METHOD FOR THE CONTINUOUS PRODUCTION OF FOAM BLOCKS OR SHEETS

[75] Inventors: Hans-Michael Sulzbach; Herbert Steilen, both of Königswinter; Horst Klahre, Sankt Augustin, all of Germany

[73] Assignee: Machinenfabrik Hennecke GmbH, Leverkusen, Germany

[21] Appl. No.: 493,082

[22] Filed: Jun. 21, 1995

[30] Foreign Application Priority Data

Jun. 29, 1994 [DE] Germany ............... 44 22 762.0

[51] Int. Cl.$^6$ ............... B29C 44/24; B29C 44/46
[52] U.S. Cl. ............... 264/46.2; 264/45.8; 264/46.4
[58] Field of Search ............... 264/45.8, 46.1, 264/46.4, 46.5, 46.2; 425/4 C

[56] References Cited

U.S. PATENT DOCUMENTS

| | | | |
|---|---|---|---|
| 3,458,609 | 7/1969 | Smith et al. | 425/4 C |
| 3,553,300 | 1/1971 | Buff | 425/4 C |
| 3,560,599 | 2/1971 | Ferstenberg | 425/4 C |
| 3,833,695 | 9/1974 | Vidal | 425/4 C |
| 3,888,608 | 6/1975 | Holl | 425/4 C |
| 4,017,245 | 4/1977 | Lang | 264/46.1 |
| 4,108,585 | 8/1978 | Proksa et al. | 425/89 |
| 4,264,291 | 4/1981 | Hoffmann et al. | 425/224 |
| 4,267,135 | 5/1981 | Stroud et al. | 264/51 |
| 4,268,236 | 5/1981 | Peille | 425/115 |

FOREIGN PATENT DOCUMENTS

| | | |
|---|---|---|
| 021564 | 1/1981 | European Pat. Off. |
| 3241520 | 5/1984 | Germany |
| 1476177 | 6/1977 | United Kingdom |

Primary Examiner—Allan R. Kuhns
Attorney, Agent, or Firm—Joseph C. Gil; Noland J. Cheung

[57] ABSTRACT

The invention relates to a method and an apparatus for the continuous production of foam blocks or sheets having an essentially rectangular cross-section from a foamable, liquid reaction mixture, possibly in the form of a liquid froth, in which the reaction mixture is applied from a stationary mixing head onto a moving lower facing sheet inclined in the longitudinal direction. An upper covering sheet is supplied from above and is brought into contact with the reaction mixture by means of a deflecting element. The deflecting element is flat in the longitudinal direction, so that a channel with an essentially constant cross-section is formed between the lower facing sheet and the upper covering sheet guided by the deflecting element, the length of which channel in a longitudinal direction is several times greater than its central height $H_M$. The deflecting element can be oscillated about an axis at the entry end where it rests on the reaction mixture by the application of pressure.

4 Claims, 3 Drawing Sheets

METHOD FOR THE CONTINUOUS PRODUCTION OF FOAM BLOCKS OR SHEETS

BACKGROUND OF THE INVENTION

The present invention relates to a method and an apparatus for the continuous production of rectangular foam blocks or sheets from a liquid froth or a foamable reaction mixture. Preferred froths and foamable reaction mixtures are those which react to form polyurethanes and typically consist of polyisocyanates, compounds containing isocyanate-reactive hydrogen atoms, such as polyester or polyether polyols, catalysts, stabilizers, and other additives. Typical blowing agents include water, low-boiling olefins, such as pentane, and liquid carbon dioxide.

In the continuous production of foam blocks or sheets, the foamable mixture, which generally has a viscosity of between 200 and 2,000 mPa·s, is applied to a lower facing sheet resting on a conveyor belt, distributed over the width of the conveyor belt, covered with an upper facing sheet, cured and cut into blocks transversely to the direction of movement of the conveyor belt.

The foamable mixture applied to the conveyor belt can have a density of between 50 and 1,200 kg/m$^3$, depending on whether i) a bubble-free reaction mixture is used, which does not expand until applied to the conveyor belt as a result of the reaction of water with the isocyanate to form $CO_2$ (chemical foam formation, rising time), or ii) a liquid froth is applied which has been produced by beating in air (mechanical foam formation), or iii) by adding liquid carbon dioxide under pressure (physical foam formation) and which then expands further by additional chemical foaming.

The most widely used industrial method for applying the foam comprises applying the foamable mixture or the liquid froth to the conveyor belt from one or more essentially spot-shaped discharge devices which are connected to the mixhead for the production of the reaction mixture. The problem posed by this method is not only that of distributing the foamable mixture evenly over the width of the conveyor belt, but also that of preventing the inclusion of air when the upper facing sheet is applied.

U.S. Pat. No. 4,108,585 (corresponding to German Auslegungschrift 2,557,572) proposes solving this problem by adding the upper facing sheet from above and deflecting it via a levelling device (described as a roller or rocker) which is positioned above the lower conveyor belt in such a manner that a pile of foamable mixture forms on the rear side (in relation to the direction of movement of the conveyor belt) which prevents air from entering beneath the upper conveyor belt and at the same time helps to level the distribution of the mixture over the width of the lower conveyor belt.

In order to ensure a uniform age of the foamable mixture, the conveyor belt is downwardly inclined in the direction of travel—at least in the region of application. This prevents the foamable mixture from spreading out in an opposite direction to the direction of travel at the actual point in time of its application, which would result in a disadvantageous age distribution of the foam. Due to this inclination of the conveyor belt, the foamable mixture is not only moved along by the lower conveyor belt but its rate of flow is also increased in relation to the conveyor belt. This rate of flow is greatest at the point on the downward slope of the lower belt furthest from the feed point in the direction of travel. Thus the foamable mixture passes beneath the levelling device which is equal in width to the lower conveyor belt, so that a rectangular foam cross-section with a uniform foam density cannot actually be obtained.

Furthermore, it has already been proposed in U.S. Pat. No. 4,264,291 (corresponding to European Patent 25,084) to use a flat elongated deflecting element for the upper facing sheet which is essentially parallel to the conveyor belt so that a flow channel is formed in the direction of the conveyor belt. It has, however, been found that a fixed distance between the flat deflecting element and the conveyor belt does not allow for possible minimal fluctuations in the flow behavior of the foamable mixture which occur when the unit is operated over longer periods. Thus the mixture is either pressed against the lateral boundary walls (if the distance is too small) or the mixture does not reach the lateral boundary walls (if the distance is too great). This is particularly the case where the foamable mixture already consists of a froth and has therefore been obtained by expanding a pressurized reaction mixture which, for example, contains physically dissolved carbon dioxide.

DESCRIPTION OF THE INVENTION

The present invention represents an improvement over the apparatus described in U.S. Pat. No. 4,264,291. More particularly, it is proposed according to the present invention to adjustably fix the distance of the deflecting element only at that end at which the foamable mixture enters the above described channel, while at the same time allowing the flat deflecting element to oscillate freely about the axis of fixation at the entry end of the foamable mixture, and the freely oscillating exit end exerts an adjustable pressure on the foamable mixture. The distance at the entry end and the pressure can be obtained either by applying a corresponding weight to the freely oscillating end or hydraulically, so that the flat deflecting element rests on the foamable mixture in an essentially parallel position to the conveyor belt.

The length of the deflecting element in the direction of travel of the conveyor belt should be several times greater than the distance from the lower conveyor belt of the central point of the deflecting element, i.e. the length L of the channel in the direction of travel should be several times greater than the central height $H_M$ of the channel. Preferably the ratio of L to $H_M$ should be between 10 and 100:1, and more preferably between 20 and 30:1.

The channel forms a flow-resisting force which automatically changes according to fluctuations in the flow behavior of the foamable mixture and counteracts the flow of the foamable mixture relative to the conveyor belt and the upper and lower facing sheets in contact with the foamable mixture, so that an effective transverse distribution of the foamable mixture over the conveyor belt takes place.

According to the invention, the height of the channel at the point of exit of the foamable mixture from the channel, $H_A$, should preferably vary by at most between a third of and three times, and preferably between half and twice, the height of the channel at the point of entry of the foamable mixture into the channel, $H_E$.

Preferably, provision is made for the downward pressure of the freely oscillating exit end to be adjustable without any stoppages of the processing operation.

According to a further preferred embodiment of the invention, the deflecting element is covered by a sheet (release sheet), to which the foamable mixture does not adhere and which moves at a speed corresponding to only 1/10 to 1/1000 the speed of the conveyor belt and which is removed from the foamable mixture and optionally wound onto a holder after the mixture has passed through the channel formed by the deflecting element. The upper facing sheet for the foam is then added after the foamable mixture has passed through the channel.

The invention will now be explained in more detail with reference to the attached figures.

Figure 1:
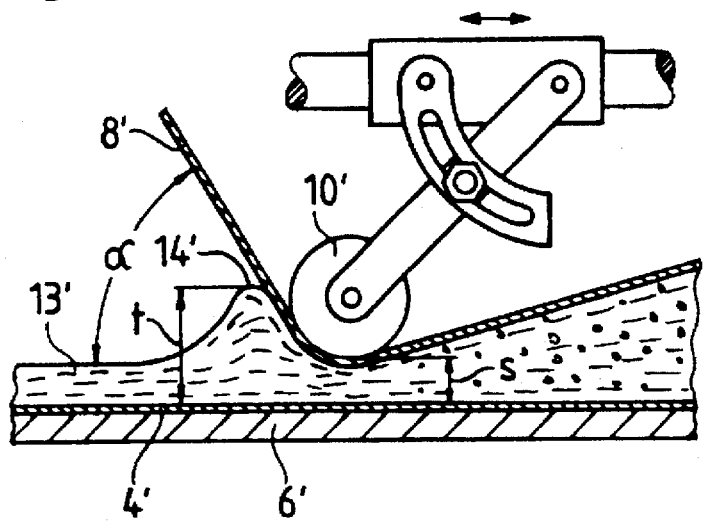
FIG. 1 corresponds to FIG. 2 of U.S. Pat. No. 4,108,585.

FIG. 1 depicts the apparatus according to the prior art, which prevents the entry of air into the intermediate space between the facing sheets. The foamable mixture has been applied to the lower facing sheet 4' which is transported by conveyor belt 6'. The upper facing sheet 8' is brought into contact with the foamable mixture essentially from above, via the levelling device (or deflecting roller) 10', which is positioned above the foamable mixture 13'. The size of the gap S, i.e. the smallest distance between the conveyor belt 6' and the upper facing sheet 8' is such that a barrier 14' consisting of a pile of foamable mixture is formed upstream of the deflecting roller 10' in the direction of travel. The deflecting roller 10' touches the foamable mixture at the point such that the foam begins to rise, as a result of the chemical reaction, downstream of the roller 10' in the direction of travel.

Figure 2:
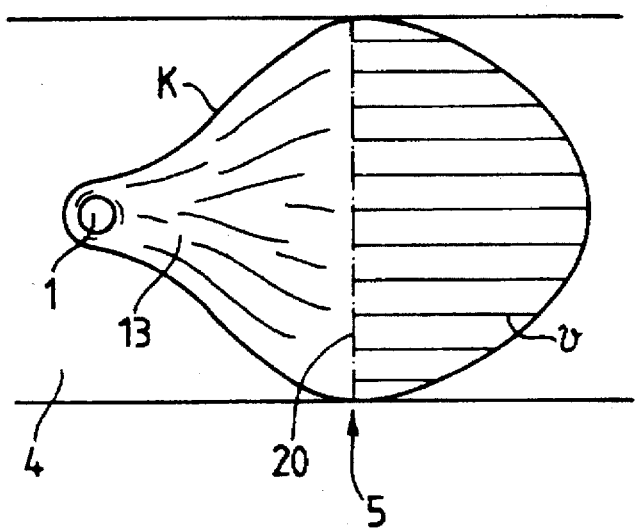
FIG. 2 is a top view of the conveyor belt of FIG. 1.

FIG. 2 diagrammatically depicts a top view onto the conveyor belt of FIG. 1. The foamable mixture 13 is applied to the lower facing sheet 4 at an essentially spot-shaped feed point 1. Due to the flow of the foamable mixture 13, it has the roughly depicted distribution contour K prior to its entry into gap 5, which is indicated by line 20. On the right of line 20, the profile of the rate of flow through gap S of the foamable mixture relative to the lower facing sheet 4 is depicted as v.

Figure 3:
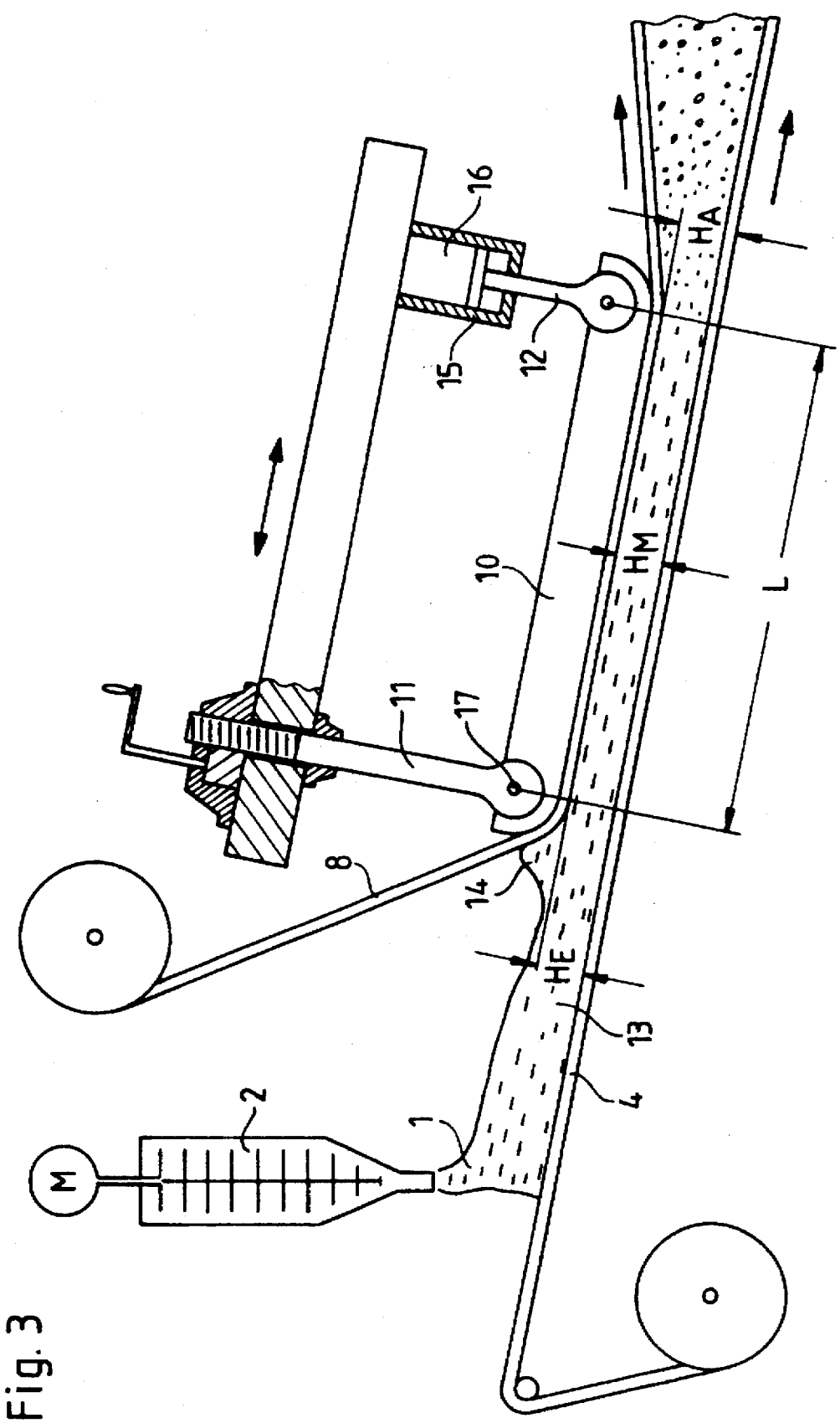
FIGS. 3 and 4 illustrate two embodiments of the apparatus of the present invention.

FIG. 3 illustrates a method and apparatus according to the present invention. The foamable mixture 13 is applied to the lower facing sheet 4 from the mixhead 2 at the feed point 1. The facing sheet 4 is conveyed along a non-depicted conveyor belt. The upper facing sheet 8 is applied to the foamable mixture 13 from above, i.e. preferably at an angle of at least 60° to the lower facing sheet 4 and slides along the deflecting element 10 according to the invention. The distance between the surface of the lower facing and the deflecting element at the point where the foamable mixture enters the channel formed by the lower facing and the deflecting element, $H_E$, is adjusted by means of the height-adjustable holder 11 so that a barrier 14 consisting of a pile of foamable mixture is formed upstream of the deflecting element which prevents the entry of air between the facing sheets. The underside of the deflecting element 10 is flat so that a channel of length L is formed. The deflecting element 10 can oscillate freely about the axis 17 at the end at which the foamable mixture enters the channel formed between the deflecting element 10 and the lower facing sheet 4. The hydraulic element 15, which acts on the holder of the deflecting element 12 at the exit end, ensures that a hydraulically adjustable downward pressure is applied to the foamable mixture by the deflecting element 10. According to the invention, the length L of the deflecting element should be several times the height $H_M$ at the central point of the channel formed between the lower facing sheet 4 and the deflecting element 10. The deflecting element 10 is arranged in such a position in the direction of travel that the foam rises downstream of the point of exit of the foamable mixture from the channel.

Figure 4:
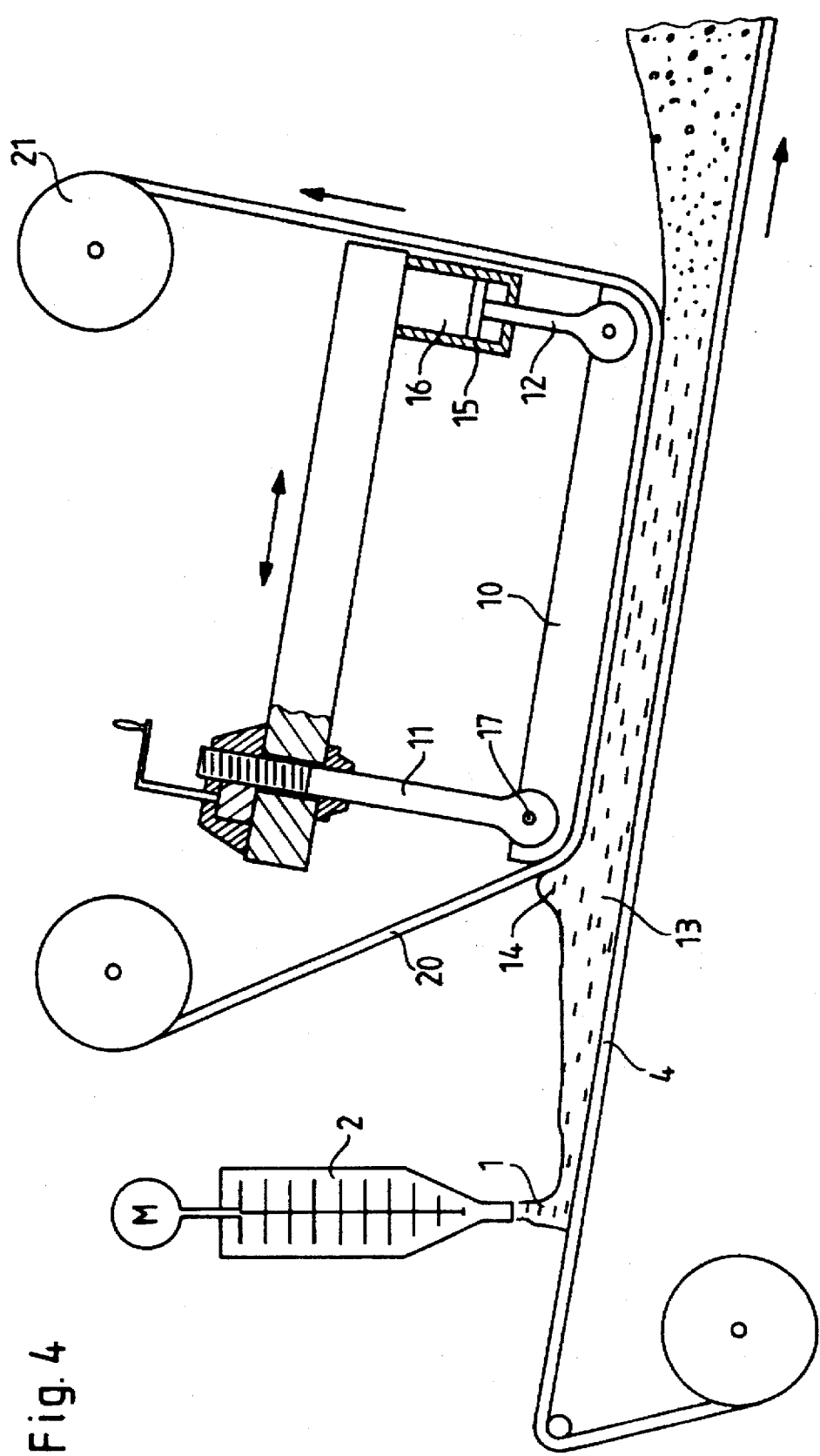

FIG. 4 shows an apparatus according to the invention which is similar to that of FIG. 3 except that a slowly moving polyethylene film 20 replaces the upper facing sheet and is rewound onto roller 21.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the continuous production of foam blocks or sheets having essentially rectangular cross-sections from a foamable, liquid reaction mixture, optionally in the form of a liquid froth, comprising applying the reaction mixture from a stationary mixhead onto a moving lower facing sheet which is inclined in the longitudinal direction, supplying an upper covering sheet from above, said upper covering sheet being brought into contact with the reaction mixture by passing said covering sheet around a deflecting element which is positioned above said lower sheet, said upper covering sheet covering said deflecting element is transported at a speed of 1/10 to 1/1000 that of said lower facing sheet and is removed from said reaction mixture downstream of said deflecting element, and said deflecting element is flat in the longitudinal direction, so that a channel is formed between said lower covering sheet and said upper covering sheet guided by said deflecting element, the positioning and structure of said deflecting device being such that the length L of said channel in the longitudinal direction is several times its central height $H_M$, and wherein the height of the channel $H_E$, at the point of entry of the reaction mixture, is adjustably fixed and the height of said channel $H_A$, at the point of exit of the reaction mixture, is self adjustable according to an adjustable constant downward pressure of said deflecting element.

2. The method of claim 1, wherein the ratio of L to $H_M$ is between 10 and 100:1.

3. The method of claim 1, wherein the height of the channel at the point of exit of the reaction mixture $H_A$ varies by a ratio of between 0.3:1 and 3.0:1 in relation to the height of the channel at the point of entry of the reaction mixture $H_E$.

4. The method of claim 2, wherein the ratio of L to $H_M$ is between 20 and 30:1.

* * * * *